(12) United States Patent
Novlan et al.

(10) Patent No.: US 10,644,974 B2
(45) Date of Patent: May 5, 2020

(54) MEASUREMENTS AND RADIO LINK MONITORING IN A WIRELESS COMMUNICATIONS SYSTEM

(71) Applicant: AT & T Intellectual Property I, L.P., Atlanta, GA (US)

(72) Inventors: Thomas Novlan, Austin, TX (US); Milap Majmundar, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/587,237

(22) Filed: May 4, 2017

(65) Prior Publication Data

US 2018/0324780 A1 Nov. 8, 2018

(51) Int. Cl.
*H04L 12/26* (2006.01)
*H04L 12/24* (2006.01)
(Continued)

(52) U.S. Cl.
CPC ...... *H04L 43/0811* (2013.01); *H04L 41/0853* (2013.01); *H04W 24/10* (2013.01); *H04W 24/04* (2013.01); *H04W 88/085* (2013.01)

(58) Field of Classification Search
CPC ........... H04W 72/046; H04W 72/0486; H04W 72/0413; H04W 88/085; H04L 43/0811
See application file for complete search history.

(56) References Cited

U.S. PATENT DOCUMENTS 5,937,019 A 8/1999 Padovani
6,128,486 A 10/2000 Keskitalo et al.
(Continued)

FOREIGN PATENT DOCUMENTS

CA 2975069 A1 8/2016
CN 101185200 B 7/2011
(Continued)

OTHER PUBLICATIONS

Capone et al., "Context information for fast cell discovery in mm-wave 5G networks." European Wireless 2015; 21th European Wireless Conference; Proceedings of VDE, 2015. https://arxiv.org/pdf/1501.02223. Retrieved on May 22, 2017, 6 pages.
(Continued)

*Primary Examiner* — Andrew Lai
*Assistant Examiner* — Harry H Kim
(74) *Attorney, Agent, or Firm* — Amin, Turocy & Watson, LLP

(57) ABSTRACT

Facilitating measurements and radio link monitoring in a wireless communications system is provided herein. A method can comprise determining, by a network device of a communications network and comprising a processor, a first resource configuration related to first measurement resources of a first radio link between a mobile device and a first distributed unit of distributed units of the communications network. The method can also comprise determining, by the network device, a second resource configuration related to a second measurement resources of a second radio link between the mobile device and a second distributed unit of the distributed units. Further, the method can comprise facilitating, by the network device, a transmission of a report that comprises the first resource configuration and the second resource configuration.

20 Claims, 10 Drawing Sheets

(51) Int. Cl.
*H04W 24/10* (2009.01)
*H04W 24/04* (2009.01)
*H04W 88/08* (2009.01)

(56) References Cited

U.S. PATENT DOCUMENTS

| | | |
|---|---|---|
| 6,167,286 A | 12/2000 | Ward et al. |
| 6,871,071 B2 | 3/2005 | Takao et al. |
| 7,079,843 B2 | 7/2006 | Iacono et al. |
| 7,242,955 B2 | 7/2007 | Frank et al. |
| 7,308,264 B2 | 12/2007 | Stern-berkowitz et al. |
| 7,324,817 B2 | 1/2008 | Iacono et al. |
| 7,460,834 B2 | 12/2008 | Johnson et al. |
| 8,238,835 B2 | 8/2012 | Nagai et al. |
| 8,244,254 B2 | 8/2012 | Kashiwase |
| 8,265,702 B2 | 9/2012 | Iacono et al. |
| 8,280,375 B2 | 10/2012 | Du et al. |
| 8,750,896 B2 | 6/2014 | Brisebois et al. |
| 9,094,977 B2 | 7/2015 | Li et al. |
| 9,319,890 B2 | 4/2016 | Brisebois et al. |
| 9,344,234 B2 | 5/2016 | Lin et al. |
| 9,444,692 B2 | 9/2016 | Lehane |
| 9,491,764 B1 | 11/2016 | Ross et al. |
| 9,497,673 B2 | 11/2016 | Blankenship |
| 9,578,671 B2 | 2/2017 | Blankenship |
| 9,596,612 B2 | 3/2017 | Brisebois et al. |
| 9,674,852 B2 | 6/2017 | Heo |
| 9,699,802 B2 | 7/2017 | Vannithamby |
| 10,021,597 B2 | 7/2018 | Majmundar |
| 10,206,142 B2 | 2/2019 | Majmundar |
| 2001/0018342 A1* | 8/2001 | Vialen .................. H04W 76/19 455/423 |
| 2006/0246907 A1 | 11/2006 | Kaikkonen et al. |
| 2006/0276229 A1 | 12/2006 | Braun et al. |
| 2011/0021154 A1* | 1/2011 | Marinier ............... H04W 72/02 455/67.11 |
| 2012/0213106 A1 | 8/2012 | Boehm |
| 2013/0040692 A1* | 2/2013 | Chen .................... H04W 36/04 455/525 |
| 2013/0121185 A1 | 5/2013 | Li et al. |
| 2014/0073337 A1* | 3/2014 | Hong .................... H04W 16/28 455/452.1 |
| 2014/0192740 A1 | 7/2014 | Ekpenyong |
| 2014/0247731 A1 | 9/2014 | Nagaraj |
| 2014/0293896 A1 | 10/2014 | Kuo |
| 2014/0342748 A1* | 11/2014 | Zou .................. H04W 72/0426 455/452.1 |
| 2015/0139195 A1* | 5/2015 | Xiao .................... H04W 36/22 370/332 |
| 2015/0181473 A1 | 6/2015 | Horn |
| 2015/0215912 A1 | 7/2015 | Jha |
| 2015/0256300 A1 | 9/2015 | Lin et al. |
| 2015/0318916 A1 | 11/2015 | Gopal et al. |
| 2015/0382290 A1* | 12/2015 | Yaacoub ........... H04W 52/0206 370/311 |
| 2016/0057800 A1 | 2/2016 | Ingale |
| 2016/0066233 A1 | 3/2016 | Balachandran |
| 2016/0095004 A1 | 3/2016 | Tseng |
| 2016/0150435 A1 | 5/2016 | Baek et al. |
| 2016/0198383 A1 | 7/2016 | Worrall |
| 2016/0234714 A1 | 8/2016 | Basu |
| 2016/0255665 A1 | 9/2016 | Futaki |
| 2016/0353510 A1 | 12/2016 | Zhang et al. |
| 2016/0381609 A1 | 12/2016 | Alriksson et al. |
| 2017/0006539 A1 | 1/2017 | Kakishima et al. |
| 2017/0019903 A1 | 1/2017 | Talukdar et al. |
| 2017/0041968 A1 | 2/2017 | Jin |
| 2017/0071023 A1 | 3/2017 | Kunz |
| 2017/0164281 A1 | 6/2017 | Chiba |
| 2017/0188248 A1 | 6/2017 | Muller |
| 2017/0289867 A1* | 10/2017 | Fan .................... H04W 36/0061 |
| 2018/0091262 A1 | 3/2018 | Jung et al. |
| 2018/0212651 A1* | 7/2018 | Li ........................ H04B 7/0695 |
| 2018/0249526 A1* | 8/2018 | Nagaraja ............... H04W 24/08 |
| 2019/0174355 A1 | 6/2019 | Majmundar |

FOREIGN PATENT DOCUMENTS

| | | |
|---|---|---|
| EP | 3120659 A2 | 1/2017 |
| EP | 2995163 B1 | 3/2017 |
| EP | 3178290 A1 | 6/2017 |
| KR | 100749448 A1 | 8/2007 |
| KR | 10-2018-0033017 A | 4/2018 |
| WO | 2015/018494 A1 | 2/2015 |
| WO | 2016055102 A1 | 4/2016 |
| WO | 2016/180612 A1 | 11/2016 |
| WO | 2016198124 A1 | 12/2016 |
| WO | 2017010644 A1 | 1/2017 |
| WO | 2017034607 A1 | 3/2017 |

OTHER PUBLICATIONS

Shariat et al. "5G radio access above 6 GHz." Transactions on Emerging Telecommunications Technologies 27.9 (2016): 1160-1167. http://eprints.networks.imdea.org/1532/1/5G_radio_access_above_6GHz_2016_EN.pdf. Retrieved on May 22, 2017, 8 pages.
Giordani et al. "Uplink-based framework for control plane applications in 5G mmWave cellular networks." arXiv preprint arXiv:1610.04836 (2016). https://arxiv.org/pdf/1610.04836. Retrieved on May 22, 2017, 31 pages.
Halbauer et al. "Architectural aspects of mm-wave radio access integration with 5G ecosystem." 5G PPP mmMAGIC, 2016. http://eprints.networks.imdea.org/1533/1/mm-wave_architecture_white_paper.pdf. Retrieved on May 22, 2017, 17 pages.
Gimenez, "Mobility Management for Cellular Networks: From LTE Towards 5G," Jan. 2017, 308 pages.
Halbauer et al., "Millimetre-Wave Based Mobile Radio Access Network for Fifth Generation Integrated Communications," Jun. 30, 2017, 85 pages.
Rugeland et al., "Architectural enablers and concepts for mm-wave RAN integration," 5G PPP mmMAGIC, Mar. 29, 2017, 26 pages.
Thapliyal, "Mobility Robustness in 5G Networks," Aug. 12, 2016, Aalto University School of Electrical Engineering, 58 pages.
Ericsson, AT&T, "Mechanism for fast retransmission of lost PDUs," 3GPP TSG-RAN WG3 #97, Tdoc R3-173235, Aug. 2017, Berlin, Germany, 5 pages.
Ericsson, "0 ms interruption support during handover procedure in NR," 3GPP TSG-RAN WG2 #99, R2-1708028 (Resubmission of R2-1706625), Aug. 2017, Berlin, Germany, 7 pages.
Majmundar et al., "Inter-Distributed Unit Beam Switch Procedure Triggered by Radio Link Interruption", Unpublished U.S. Appl. No. 15/587,388, filed May 4, 2017, AT&T, 27 pages.
Office Action for U.S. Appl. No. 15/721,258 dated Oct. 29, 2018, 30 pages.
Office Action dated Nov. 27, 2018 for U.S. Appl. No. 15/587,388, 63 pages.
Final Office Action received for U.S. Appl. No. 15/721,258 dated Mar. 11, 2019, 20 pages.
Singh, et al. "Proportional Fair Traffic Splitting and Aggregation in Heterogeneous Wireless Networks." arXiv:1508.05542v2 [cs.Ni] Mar. 26, 2016. 4 pages.
3rd Generation Partnership Project. "3GPP TR 38.912 V1.0.0: Study on New Radio (NR) Access Technology." 3GPP, Mar. 2017. 74 pages.
Final Office Action received for U.S. Appl. No. 15/587,388 dated Jun. 17, 2019, 75 pages.
Non-Final Office Action received for U.S. Appl. No. 16/669,498 dated Dec. 23, 2019, 31 pages.
Non-Final Office Action received for U.S. Appl. No. 15/587,388 dated Feb. 13, 2020, 84 pages.

* cited by examiner

MEASUREMENTS AND RADIO LINK MONITORING IN A WIRELESS COMMUNICATIONS SYSTEM

TECHNICAL FIELD

The subject disclosure relates generally to communications systems, and for example, to facilitating measurements and radio link monitoring in a wireless communications system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
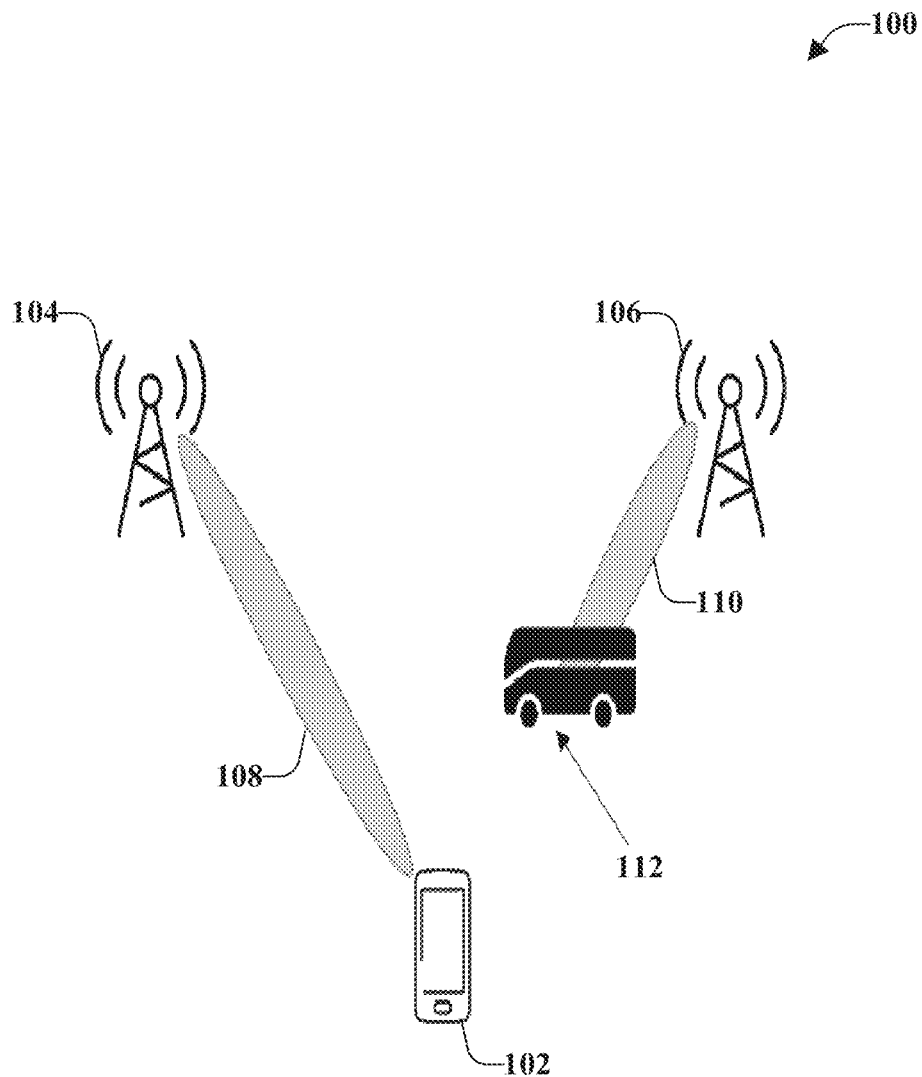
FIG. 1 illustrates an example non-limiting schematic representation of a beam failure in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Discussed herein are various aspects that relate to facilitating measurements and radio link monitoring in a wireless communications network. For example, as provided herein an inter-distributed unit (DU) beam switch (mobility) and multi-connectivity establishment can be based on measurements and reports. Also provided are corresponding configuration and/or coordination mechanisms that facilitate management of radio link interruption (also referred to as radio link failures).

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as New Radio (NR) access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In one embodiment, described herein is a method that can comprise determining, by a network device of a communications network and comprising a processor, a first resource configuration related to first measurement resources of a first radio link between a mobile device and a first distributed unit of distributed units of the communications network. The method can also comprise determining, by the network device, a second resource configuration related to second measurement resources of a second radio link between the mobile device and a second distributed unit of the distributed units. Further, the method can comprise facilitating, by the network device, a reception of one or more reports that comprise measurements of the first resource configuration and the second resource configuration. The transmission can be received from the mobile device in response to a detection of a radio link interruption of a communication of data flow packets between the mobile device and the first distributed unit or as part of an inter-DU switch procedure between the first distributed unit and a second distributed unit.

In an example, the method can comprise coordinating, by the network device, the first resource configuration and the second resource configuration among the first distributed unit and the second distributed unit. Further to this example, the coordinating can comprise communicating, by the network device, the first resource configuration to the second distributed unit and the second resource configuration to the first distributed unit. The communication can be facilitated by a central unit communicatively coupled to the first distributed unit and the second distributed unit.

In another example, the method can comprise assigning, by the network device, a first timer and a first counter for a first detection of a first radio link interruption between the mobile device and the first distributed unit and a second timer and a second counter for a second detection of a second radio link interruption between the mobile device and the second distributed unit.

According to another example, determining the first resource configuration and the determining the second resource configuration can comprise determining, by the network device, respective transmission/reception nodes controlled by the first distributed unit and the second distributed unit. Additionally or alternatively, determining the first resource configuration and the second resource configuration can comprise determining a beam forming capability of the mobile device and the distributed units. Additionally or alternatively, determining the first resource configuration and the second resource configuration can comprise determining a first network traffic load of the first distributed unit and a second traffic load of the second distributed unit. Additionally or alternatively, determining the first resource configuration and the second resource configuration can comprise determining a multi-connectivity configuration of the first distributed unit and the second distributed unit. Additionally or alternatively, determining the first resource configuration and the second resource configuration can comprise evaluating a received radio link interruption report or beam measurement report received from the mobile device.

In an example, the first distributed unit is a cell device servicing the mobile device and the second distributed unit is a neighboring cell device. In another example, the first distributed unit is associated with a first transmission/reception node servicing the mobile device and the second distributed unit is associated with a second transmission/reception node. In a further example, the first distributed unit and the second distributed unit represent a function protocol split across a first transmission/reception node and a second transmission/reception node. The first distributed unit controls the first transmission/reception node and the second distributed unit controls the second transmission/reception node. In yet another example, facilitating the reception of the report comprises facilitating beam switch procedures for the mobile device, wherein the beam switch procedures enable the mobile device to operate according to a fifth generation wireless communication network protocol.

According to another embodiment, a system can comprise a processor and a memory that stores executable instructions that, when executed by the processor, facilitate performance of operations. The operations can comprise generating a first report that comprises a first resource configuration related to first measurement resources of a first radio link between a mobile device and a first distributed unit of distributed units of a communications network. The operations can also comprise generating a second report that comprises a second resource configuration related to a second measurement of a second radio link between the mobile device and a second distributed unit of the distributed units. Further, the operations can comprise, in response to a detection of a radio link interruption of a communication of data flow packets between the mobile device and the first distributed unit, facilitating a reception of a combined report from the mobile device that comprises measurements of the first resource configuration and the second resource configuration. According to an aspect, facilitating the reception of the combined report comprises generating the combined report that is specific to the mobile device.

In an example, the operations can further comprise communicating the first resource configuration to the second distributed unit and the second resource configuration to the first distributed unit. Further to this example, the operations can comprise determining the combined configuration based on a coordination of the first resource configuration and the second resource configuration among the first distributed unit and the second distributed unit.

According to another example, the operations can comprise configuring a first timer and counter combination for a first detection of a first radio link interruption between the mobile device and the first distributed unit. Further to this example, the operations can comprise configuring a second timer and a second counter for a second detection of a second radio link interruption between the mobile device and the second distributed unit.

According to yet another embodiment, described herein is a machine-readable storage medium comprising executable instructions that, when executed by a processor, facilitate performance of operations. The operations can comprise determining respective resource configurations for distributed units in a communications network. Further, the operations can comprise facilitating sending a coordinated configuration to a mobile device, wherein the coordinated report comprises the respective resource configurations and is customized for the mobile device. The sending can be in response to an indication from the mobile device that a radio link interruption has occurred.

In an example, the distributed units comprise a first distributed unit and a second distributed unit, the respective resource configurations comprises a first resource configuration of the first distributed unit and a second resource configuration of the second distributed unit. Further to this example, the operations can further comprise communicating the first resource configuration to the second distributed unit and the second resource configuration to the first distributed unit. The communicating can be facilitated by a central unit communicatively coupled to the first distributed unit and the second distributed unit.

According to another example, the operations can further comprise assigning a first timer and a first counter for a first detection of a first radio link interruption between the mobile device and a first distributed unit of the distributed units and a second timer and a second counter for a second detection of a second radio link interruption between the mobile device and a second distributed unit of the distributed units.

An expiration of the first timer or the second timer results in a determination that the radio link interruption has occurred.

Referring initially to FIG. 1, illustrated is an example non-limiting schematic representation 100 of a beam failure in accordance with one or more embodiments described herein. As illustrated, a mobile device 102 can receive radio links, also referred to as beams, from a first network device 104 and a second network device 106. As illustrated, a first beam 108 can be established between the first network device 104 and the mobile device 102. Further, a second beam 110 can be established between the second network device and the mobile device 102. Multiple beams are established and the mobile device can switch between the multiple beams because there can be times (sometimes frequently) when one or more beams are blocked by something in the environment.

Millimeter wave (mmWave) frequencies (which is the band of spectrum between 30 Gigahertz (Ghz) and 300 Ghz) can produce a challenge for operating within NR communications networks. For example, the mmWave channel experienced by a mobile device could suffer from blockage events that could result in sudden sharp drops in signal strength (e.g., of the order of 30 dB) due to physical objects blocking the mobile device-TRP link. When a beam that is serving a mobile device experiences blockage, the mobile device can experience beam failure. This is illustrated in FIG. 1 by the second beam 110, which experiences a radio link interruption (e.g., a radio link failure, a beam failure) due to a blockage 112. In this example, the blockage is a vehicle, however, other types of blockage can occur that result in radio link interruption.

In NR communications networks, the mobile device can trigger a mechanism to recover from beam failure. According to some implementations, a beam failure event is determined to have occurred when a quality of beam pair link(s) of an associated control channel falls to an unacceptable level, which can be determined based on a comparison with a threshold quality level and an expiration (e.g., a time-out) of an associated timer. Mechanisms to recover from beam failure can be triggered when beam failure occurs (e.g., after expiration of the timer).

Figure 2:
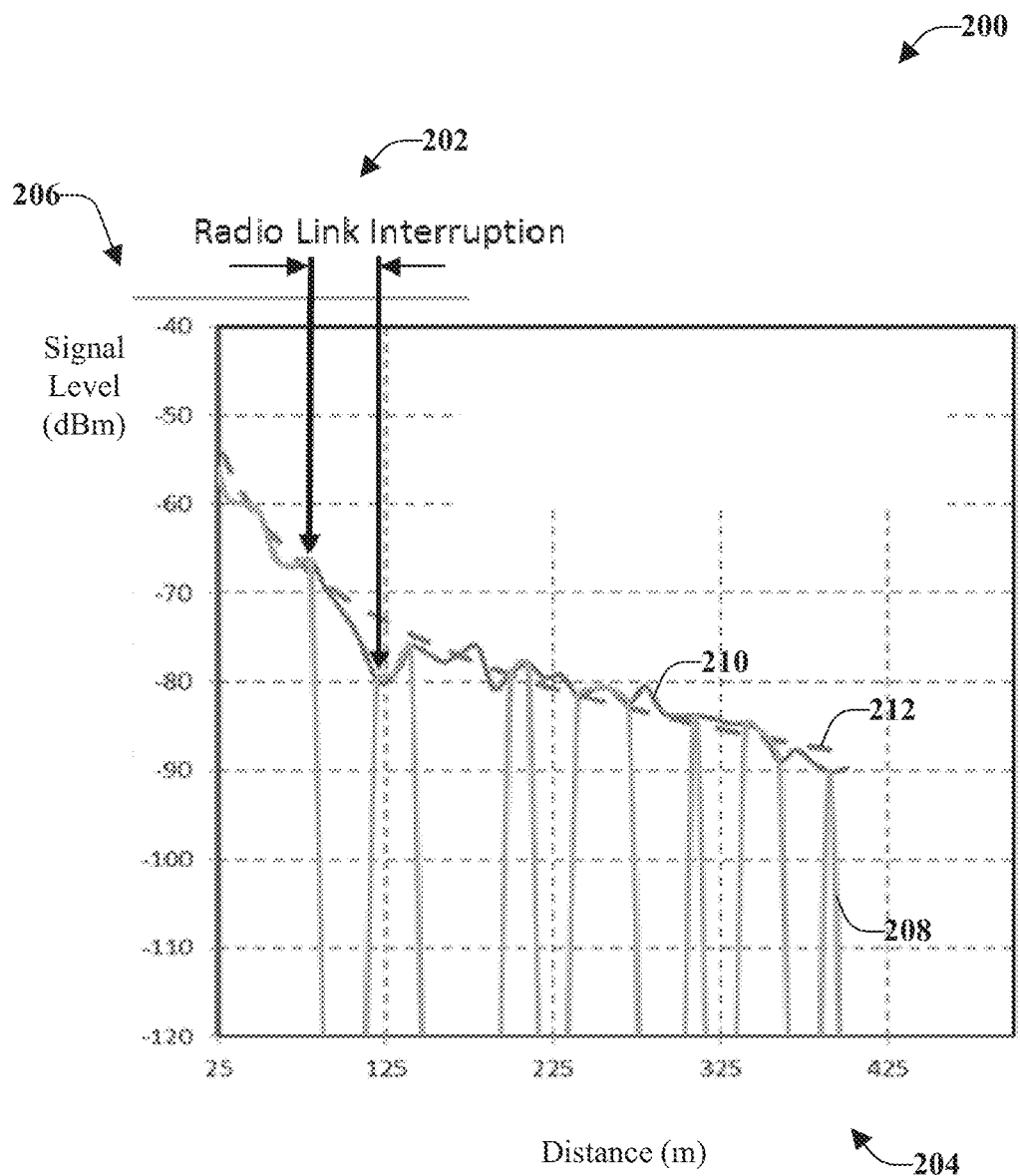
FIG. 2 illustrates an example non-limiting graph of a representative radio link interruption in accordance with one or more embodiments described herein.

FIG. 2 illustrates an example non-limiting graph 200 of a representative radio link interruption in accordance with one or more embodiments described herein. A radio link related failure event, referred to as an event Radio Link Interruption (RLI 202) can be defined to represent blockage-based beam failure events and to distinguish this type of interruption from radio link failure type of events in LTE. The RLI term can be utilized to represent that in a blockage-based beam failure event, the beam quality is "interrupted" for a relatively short period of time, and is eventually restored after the blockage event is over as illustrated in FIG. 2. Thus, the interruption is not a long term event, as it might be in mobility.

In FIG. 2, distance in meters is illustrated on the horizontal axis 204 and signal level (dBm) is illustrated on the vertical axis 206. Lines 208 indicate blocking and channel fading. Line 210 indicates shadow fading and dashed line 212 indicates no fading. As indicated by the RLI 202, the interruption is for a short period of time.

Since fast beam switching mechanisms can be supported as part of NR beam management procedures, when a mobile device detects beam failure, it could possibly trigger an attempt to switch beams. This could result in a few different situations. In one situation, if there is an available beam, and such a beam is from the same TRP, it could be possible to execute an intra-TRP beam switch. In another situation, if a beam is available from a different TRP with the same cell ID, then it could be possible to execute an inter-TRP beam switch via mobility procedures without RRC (RRC-less mobility). According to another situation, if a beam is available from a different TRP with a different cell ID, it could be possible to execute an inter-TRP beam switch via mobility with RRC. In another situation, if no beam is available (e.g. when out of NR coverage), other Radio Link Failure (RLF) procedures could detect link failure.

Figure 3:
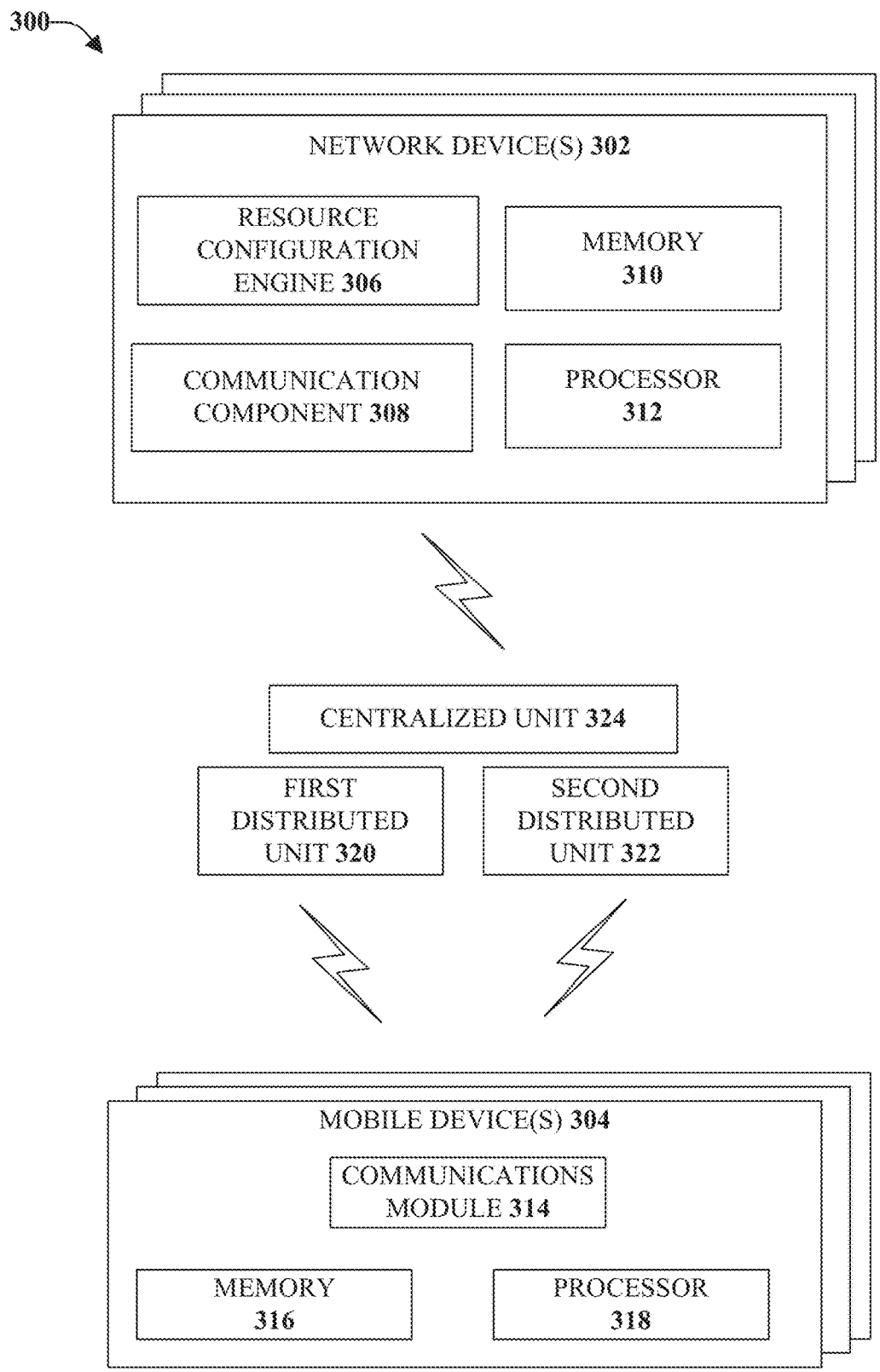
FIG. 3 illustrates an example, non-limiting communications system for facilitating measurements and radio link monitoring in a wireless communications system in accordance with one or more embodiments described herein.

FIG. 3 illustrates an example, non-limiting communications system 300 for facilitating measurements and radio link monitoring in a wireless communications system in accordance with one or more embodiments described herein. The various aspects discussed herein can provide the ability to execute beam switch procedures to handle beam failure and/or radio link interruption (RLI) events across transmission reception points (TRPs), also referred to as transmission reception point herein. The beam switch procedures can be supported by NR based on a functional protocol split being implemented, wherein multiple TRPs (belonging to the same or different cells) are controlled by different distributed units (DUs) connected to a centralized unit (CU). Inter-DU mobility can include multi-connectivity and/or L2 mobility with minimum (or negligible) Radio Resource Control (RRC) involvement procedures. Thus, the various aspects provided herein relate to the various the measurements and corresponding configurations and/or reports for these procedures.

The non-limiting communications system 300 can comprise one or more network devices (illustrated as a network device 302) and one or more mobile devices (illustrated as a mobile device 304). The network device 302 can be included in a group of network devices of a wireless network. Although only a single mobile device and a single network device are illustrated, the non-limiting communications system 300 can comprise a multitude of mobile devices and/or a multitude of network devices.

The network device 302 can comprise a resource configuration engine 306, a communications component 308, at least one memory 310, and at least one processor 312. Further, the mobile device 304 can comprise a communications module 314, a memory 316, and a processor 318. The resource configuration engine 306 can determine a first resource configuration related to first measurement resources of a first radio link between a mobile device and a first distributed unit 320 of distributed units of the communications network. The resource configuration engine 306 can also determine a second resource configuration related to a second measurement of a second radio link between the mobile device and a second distributed unit 322 of the distributed units. It is noted that the first distributed unit 320, the second distributed unit 322, and other distributed units can be communicatively coupled to the network device 302.

Based on the determined resource configurations, the communications component 308 can facilitate a reception of a report that comprises the first resource configuration and the second resource configuration. The transmission can be received from the mobile device 304 in response to a detection of a radio link interruption of a communication of data flow packets between the mobile device 304 and the first distributed unit 320. For example, after detection of a radio link interruption and after expiration of a timer associated with a duration of the radio link interruption event, the communication module can 114 send an indication of the radio link interruption to the network device. Facilitation of the transmission of the report can comprise facilitating beam switch procedures for the mobile device. The beam switch procedures can enable the mobile device to operate according to a fifth generation wireless communication network protocol.

The first resource configuration and the second resource configuration can be determined by the resource configuration engine 306 based on a determination of respective transmission/reception nodes controlled by the first distributed unit 320 and the second distributed unit 322. Additionally or alternatively, the first resource configuration and the second resource configuration can be determined by the resource configuration engine 306 based on a determination of a first network traffic load of the first distributed unit 320 and a second network traffic load of the second distributed unit 322. In an additional or alternative implementation, the first resource configuration and the second resource configuration can be determined by the resource configuration engine 306 based on a determination of a multi-connectivity configuration of the first distributed unit and the second distributed unit. Additionally or alternatively, the first resource configuration and the second resource configuration can be determined by the resource configuration engine 306 based on an evaluation of a received radio link interruption report received from the mobile device 304.

According to an implementation, the resource configuration engine 306 can coordinate communication of the resource configurations between the distributed units. For example, the resource configuration engine 306 can coordinate the first resource configuration and the second resource configuration among the first distributed unit 320 and the second distributed unit 322. Further to this implementation, the resource configuration engine 306 can communicate the first resource configuration to the second distributed unit 322 and the second resource configuration to the first distributed unit 320 (e.g., sharing the configurations among the distributed units). The communication can be facilitated by a central unit 324 communicatively coupled to the first distributed unit and the second distributed unit.

In an implementation, in order to determine that the radio link interruption is of a determined duration and that a notification should be issued from the mobile device 304 to the network device 302, the resource configuration engine 306 can assign a first timer and a first counter for a first detection of a first radio link interruption between the mobile device 304 and the first distributed unit 320 and a second timer and a second counter for a second detection of a second radio link interruption between the mobile device 304 and the second distributed unit 322.

Although illustrated as separate from the network device 302, according to some implementations, the first distributed unit 320, the second distributed unit 322, and/or the central unit 324 could be included, at least partially, in the network device 302. According to some implementations, the first distributed unit 320 can be a cell servicing the mobile device 304 and the second distributed unit 322 can be a neighboring cell of the first distributed unit 320. In an implementation, the first distributed unit 320 can be associated with a first transmission/reception node servicing the mobile device 304 and the second distributed unit 322 can be associated with a second transmission/reception node.

In accordance with some implementations, the first distributed unit 320 and the second distributed unit 322 can represent a function protocol split across a first transmission/reception node and a second transmission/reception node. Further to this implementation, the first distributed unit 320 can control the first transmission/reception node and the second distributed unit 322 can control the second transmission/reception node.

The communications component 308 and/or the communications module 314 can be a transmitter/receiver configured to transmit to and/or receive data the network device 302, the mobile device 304, other network devices, and/or other mobile devices. Through the communications component 308, the network device 302 can concurrently transmit and receive data, can transmit and receive data at different times, or combinations thereof. In a similar manner, through the communications module 314, the mobile device 304 can concurrently transmit and receive data, can transmit and receive data at different times, or combinations thereof.

The respective one or more memories 310, 316 can be operatively coupled to the respective one or more processors 312, 318. The respective one or more memories 310, 316 can store protocols associated with measurements and radio link monitoring as discussed herein. Further, the respective one or more memories 310, 316 can facilitate action to control communication between the network device 302 and the mobile device 304, such that the non-limiting communications system 300 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 312, 318 can facilitate respective analysis of information related to measurements and radio link monitoring in a communication network. The processors 312, 318 can be processors dedicated to analyzing and/or generating information received, processors that control one or more components of the non-limiting communications system 300, and/or processors that both analyze and generate information received and control one or more components of the non-limiting communications system 300.

Further, the term network device (e.g., network node, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes (e.g., network device 302) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

As discussed herein, the various aspects provide the ability to execute beam switch procedures to handle beam failure/RLI events across TRPs when a functional protocol split is implemented wherein multiple TRPs (belonging to the same or different cells) are controlled by different distributed units (DUs) connected to a centralized unit (CU). Inter-DU mobility can involve multi-connectivity or L2 nobility with minimum or negligible RRC involvement procedures and this invention describes the measurements and corresponding configurations/reports for these procedures.

Figure 4:
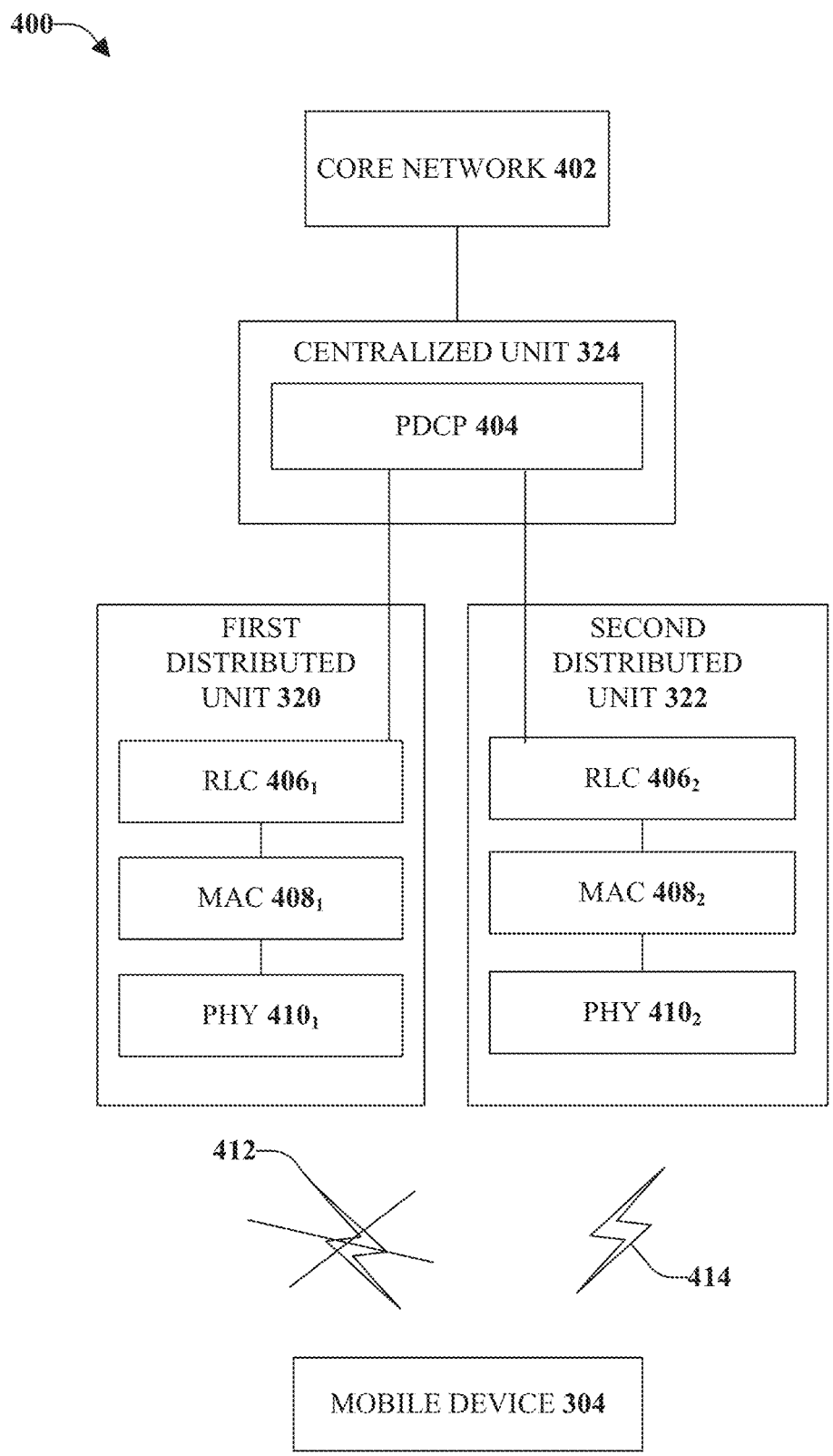
FIG. 4 illustrates an example, non-limiting representation of an inter-distributed unit beam switch procedure based on a radio link interruption trigger event in accordance with one or more embodiments described herein.

FIG. 4 illustrates an example, non-limiting representation 400 of an inter-distributed unit beam switch procedure based on a radio link interruption trigger event in accordance in accordance with one or more embodiments described herein. Repetitive description of like elements employed in other embodiments described herein is omitted for sake of brevity.

Illustrated are a core network 402 operatively coupled to the central unit 324, which is operatively coupled to the first distributed unit 320 and the second distributed unit 322. The central unit 324 can comprise a Packet Data Convergence Protocol (PDCP 404). The first distributed unit 320 and the second distributed unit 322 can comprise respective protocol layers comprising a Radio Link Control (RLC 406), a Media Access Control (MAC 408), and a Physical Layer (PHY 410).

The first distributed unit 320 communicates with the mobile device 304 over a first link 412 and the second distributed unit 322 communicates with the mobile device 304 over a second link 414. In this example, the first link 412 has an "X" over it, indicating a radio link interruption.

The various aspects herein can provide a procedure for executing inter-DU beam switch in response to an RLI trigger when no beams are available to support the mobile device from the current serving DU. As depicted in FIG. 4, when the serving beam (e.g., the first link 412) fails but no other beam is available from the first distributed unit 320 (RLI trigger), a switch to a beam available via a different DU (e.g. the second distributed unit 322) is implemented. The inter-DU beam switch (mobility) and multi-connectivity establishment can be triggered based on measurements and reports described herein.

Figure 5:
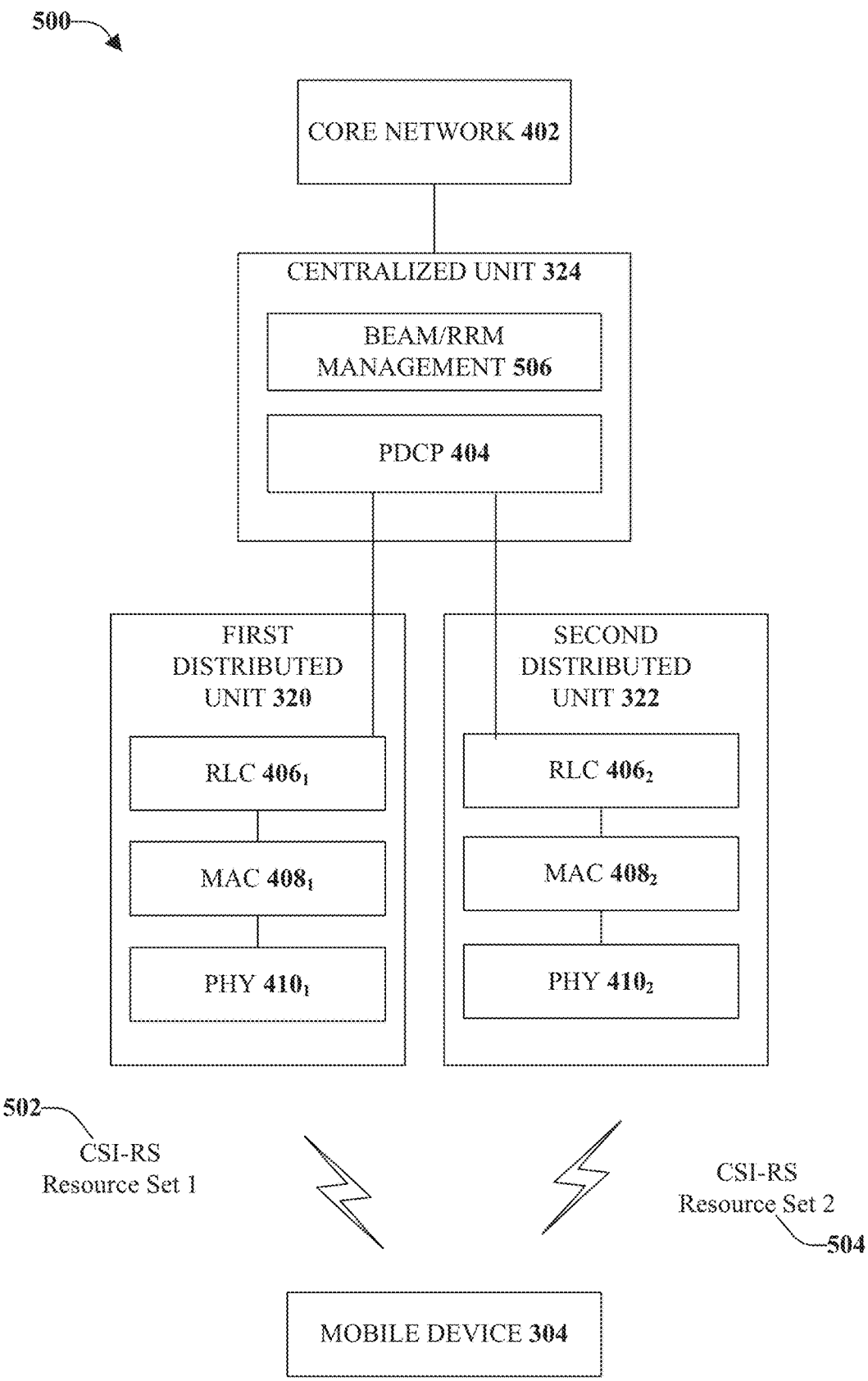
FIG. 5 illustrates an example, non-limiting representation of inter-distributed unit mobility measurements in accordance with one or more embodiments described herein.

FIG. 5 illustrates an example, non-limiting representation 500 of an inter-distributed unit mobility measurements in accordance in accordance with one or more embodiments described herein. Repetitive description of like elements employed in other embodiments described herein is omitted for sake of brevity.

The distributed unit mobility includes, for example, multi-connectivity or L2 mobility with minimal RRC involvement. In NR, a measurement object can be mobile device-specifically configured or tailored (e.g. RRC signalling) for CONNECTED mode mobile device. Further, the measurement can contain a list of Channel State Information Reference Signals CSI-RS) resource configurations for measuring beams from serving TRPs/cells and neighbour TRPs/cells.

The set of CSI-RS resources for a given mobile device to measure the beams (analog or digital) coming from a single distributed unit can be configured based on the available beams at the TRP(s) controlled by the distributed unit.

However, in order to support Inter-DU switching/mobility CSI-RS resources should be configured for the mobile device corresponding to multiple DUs. For example, a first CSI-RS Resource Set 502 can be associated with the first distributed unit 320/mobile device 304 link, and a second CSI-RS Resource Set 504 can be associated with the second distributed unit 322/mobile device 304 link. A Beam/RRM Management component 506 (e.g., the resource configuration engine 306 of FIG. 1) can perform this configuration taking into account multiple factors including, but not limited to, TRP and mobile device beamforming capability, traffic load, multi-connectivity configuration, reception of one or more RLI reports, and/or Inter-DU and CU coordination.

In addition, the set of DUs for which CSI-RS resources are configured for the mobile device could dynamically change. For example, DUs could be added or removed to the set depending upon various factors including receiving RLI reports which would require (re)configuration of the measurement resources and report.

Figure 6:
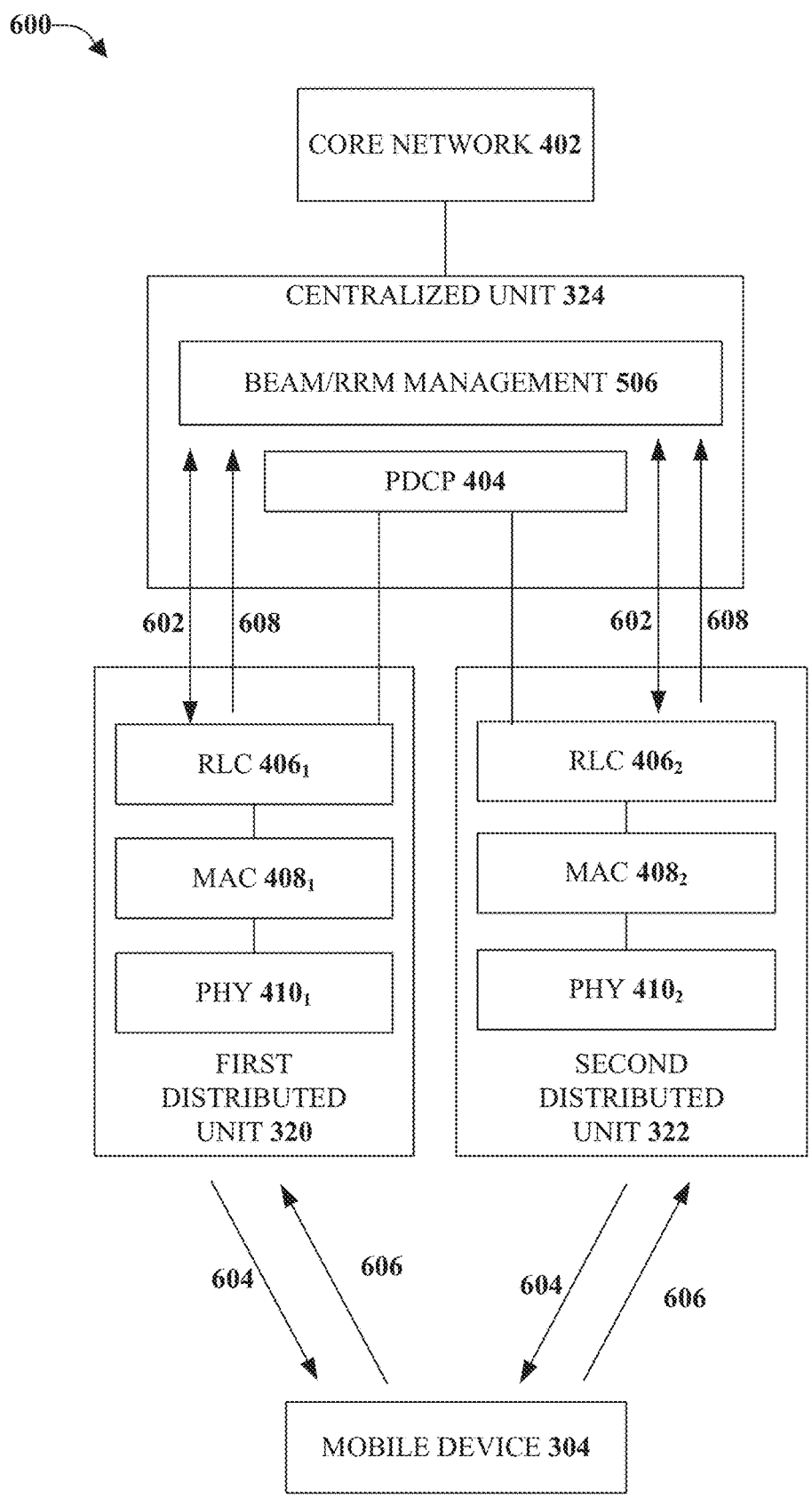
FIG. 6 illustrates an example, non-limiting representation of an inter-distributed unit measurement configuration and coordination in accordance with one or more embodiments described herein.

FIG. 6 illustrates an example, non-limiting representation 600 of an inter-distributed unit measurement configuration and coordination in accordance in accordance with one or more embodiments described herein. Repetitive description of like elements employed in other embodiments described herein is omitted for sake of brevity.

The arrows 602 represent measurement configuration coordination. A set of measurement resources can determined for each DU and exchanged across DUs through the central unit 324. The coordination messages can be provided per DU or as a common configuration from a central beam/RRM management entity and correspond to mobile device-specific or mobile device-group-specific resources The arrows 604 represent mobile device specific measurement configuration. A mobile device can be provided with a measurement configuration enabling beam-based measurement of one or multiple DUs. This can be provided as a common configuration by a master node or provided separately by each DU/SgNB cell group.

The arrows 606 represent a mobile device measurement report. The mobile device can measure beam strength/quality across TRP/DUs and can report the measurement results (through physical or higher layer signaling) to one or more DUs after receiving a beam management or RRM measurement trigger.

Further, the arrows 608 represent Inter-DU Measurement report coordination. The measurement results of one or more DUs can be exchanged as part of a beam/RRM management procedure and can trigger an Inter-DU switch or measurement reconfiguration procedure.

According to some implementations, CSI-RS based measurement configuration can include a set of time/frequency resources and scrambling identities (e.g. cell or virtual cell IDs) which can include frequency/time domain resource patterns (including time offset from SS-block or radio frame boundary). Additionally or alternatively, the configuration can include SS-block time index and/or cell ID. In additional or alternative implementations, the configuration can include one or more reporting IDs (which can correspond to different DU/TRP/SgNB beam groups). Additionally or alternatively, the configuration can include beam quality thresholds (which can be separately configured for serving or neighbor TRP/cells. In additional or alternative implementations, the configuration can include a number of beams monitored/reported per DU based on mobile device capability (e.g. number of simultaneous RF beams and CSI-RS ports). Further, in additional or alternative implementations, the configuration can include reporting periodicity, event triggers, and measurement report format (e.g. L1 or L2).

In addition, although measurements have been described herein based on CSI-RS, the above configuration and measurement reports could be extended to synchronization signals (SS-block) based measurements for beam management and RRM.

Figure 7:
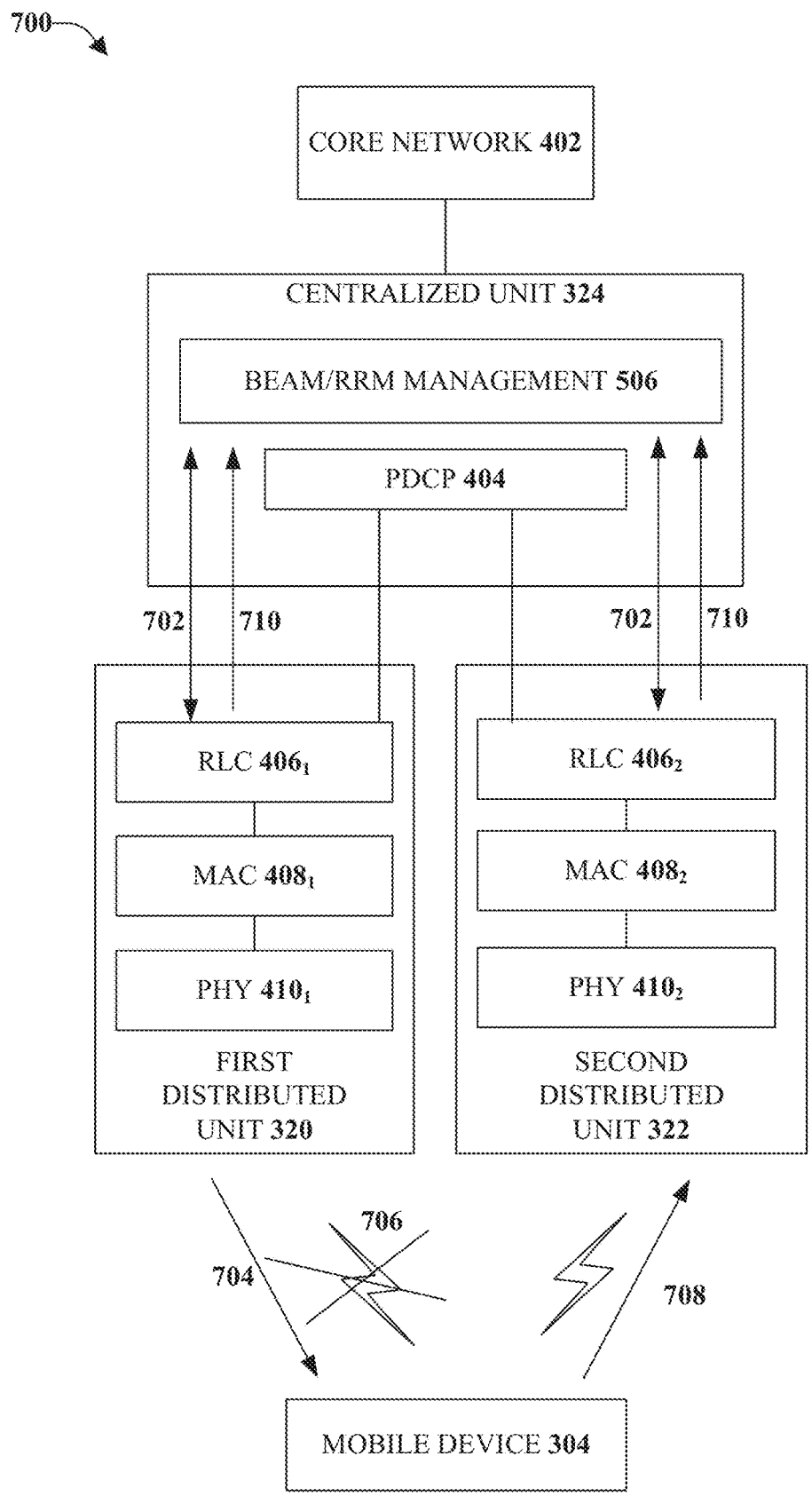
FIG. 7 illustrates an example, non-limiting representation of beam failure/radio link interruption timers, counters, and reports for new radio inter-distributed unit mobility and multi-connectivity in accordance with one or more embodiments described herein.

The SS-block measurements can be explicitly or implicitly linked to one or more CSI-RS resources. For example, a group of CSI-RS resources can correspond to narrow beams within a wider SS-block beam. The configuration of the CSI-RS resources at the DUs can be determined after a first coarse beam sweep procedure at the mobile device based on SS-block measurements FIG. 7 illustrates an example, non-limiting representation 700 of beam failure/RLI timers, counters, and reports for NR Inter-DU mobility and multi-connectivity in accordance in accordance with one or more embodiments described herein. Repetitive description of like elements employed in other embodiments described herein is omitted for sake of brevity.

In a traditional Radio Link Failure (RLF) procedure, such as that defined for LTE, the mobile device can detect up to N310 consecutive out-of-sync intervals, before starting an RLF time T310 (in seconds), where T are timers and N are counters. The mobile device can declare a RLF at the expiration of T310. However, for NR, in addition to the timers and counters supported for RLF, NR can support configuration of multiple timers/counters for beam failure/RLI detection and reports. This configuration and subsequent reports for RLI can be per-DU or coordinated across DUs by a central unit similar to the measurement configuration mentioned earlier. The configuration can be mobile device-specific or mobile device group-specific based on beam/DU/SgNB groups The mobile device can indicate beam failure/RLI based on the RLI configuration to one or multiple DUs which can initiate a DU switch procedure (e.g. flow control between active and secondary DUs/SgNBs via multi-connectivity or L2 mobility procedure) or measurement re-configuration. Additionally, detection of beam failure/RLI can trigger the initiation of RLF detection and procedures at the UE Arrows 702 represent RLI configuration and coordination. Mobile device RLI configuration is represented by arrow 704. RLI detection (time and counter limitation) is represented by arrow 706. The UE-RLI report 708 can be sent from the mobile device. Further, arrows 710 represent the DU-RLI report exchange and coordination.

As it relates to NR RLI counters and timers, the RLI timers and constants can be configured per-beam (or beam-group/DU). Different timer values can be applied for monitoring different beam types. For example active beams versus secondary beams. The configuration of the RLI timers/counters and corresponding beam quality thresholds can be exchanged and coordinated across nodes (e.g. at a CU) and the values can be determined based on the beam-forming capability at different DUs and based on the ability to perform Inter-DU/L2 mobility across multiple DUs (e.g. if multi-connectivity is supported) and prior RLI reports As it relates to the relationship between RLI timers and RLF timers, beam recovery failure can occur when N consecutive beam quality is less than a threshold (e.g. beam-not-detected), where N is an integer. After RLI timer expires, the mobile device can initiate beam recovery and transmit a Beam Failure/RLI Indication and initiate RLF timer (cancel if beam recovery succeeds). If RLF timer expires, the mobile device can declare a RLF.

The following table provides example, non-limiting timers and constants that can be utilized in RLI:

| TX01 | Transmission of Beam Failure/RLI Indication |
|---|---|
| TX10 | Upon detecting problems with the monitored beam (e.g., upon receiving NX10 consecutive beam -not-detected indications from lower layers) |
| TX11 | Upon initiating Beam Recovery procedure |
| NX10 (constant) | Maximum number of consecutive beam-not-detected indications received from lower layers |
| NX11 (constant) | Maximum number of consecutive beam detected indications received from lower layers |

Figure 8:
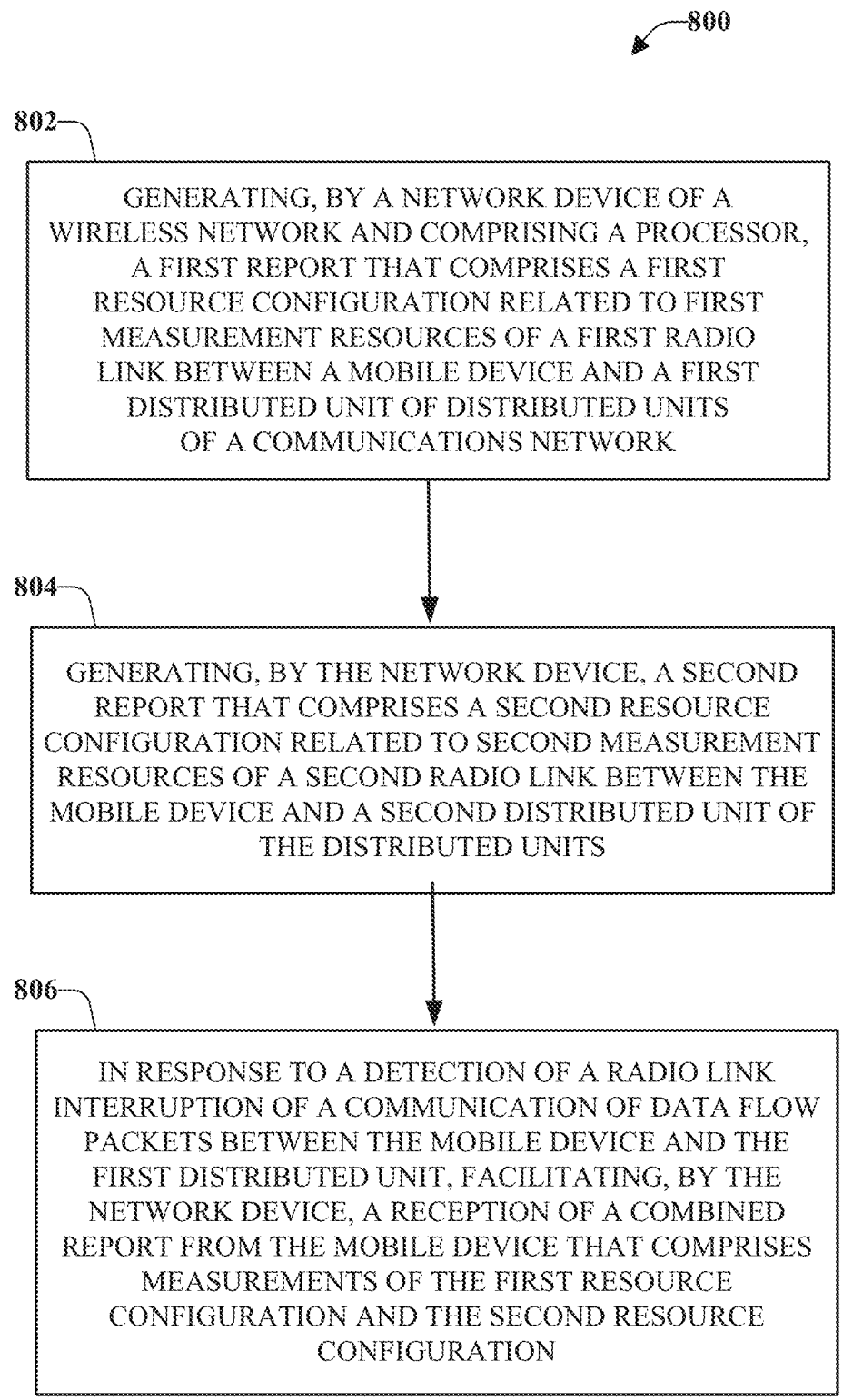
FIG. 8 illustrates an example, non-limiting method for measurements and radio link monitoring in a wireless communications system in accordance with one or more embodiments described herein.

FIG. 8 illustrates an example, non-limiting method 800 for measurements and radio link monitoring in a wireless communications system in accordance with one or more embodiments described herein. At 802, a network device of a wireless network and comprising a processor can generate a first configuration that comprises a first resource configuration related to first measurement resources of a first radio link between a mobile device and a first distributed unit of distributed units of a communications network. At 804, the network device can generate a second configuration that comprises a second resource configuration related to second measurement resources of a second radio link between the mobile device and a second distributed unit of the distributed units.

At 806, in response to a detection of a radio link interruption of a communication of data flow packets between the mobile device and the first distributed unit or as part of an inter-DU switch procedure between the first distributed unit and a second distributed unit, the network device can facilitate a reception of one or more reports from the mobile device that comprises measurements of the first resource configuration and the second resource configuration. Facilitating the transmission of the one or more reports can comprise generating the combined report that is customized for the mobile device.

In order to create the combined report, the method can include communicating the first resource configuration to the second distributed unit and the second resource configuration to the first distributed unit. Further, the method can include determining the combined report based on a coordination of the first resource configuration and the second resource configuration among the first distributed unit and the second distributed unit.

According to some implementations, the method can include configuring a first timer and counter combination for a first detection of a first radio link interruption between the mobile device and the first distributed unit. Further to this implementation, the method can include configuring a second timer and a second counter for a second detection of a second radio link interruption between the mobile device and the second distributed unit.

Described herein are systems, methods, articles of manufacture, and other embodiments or implementations that can facilitate measurements and radio link monitoring in a 5G network. Facilitating of measurements and radio link monitoring in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
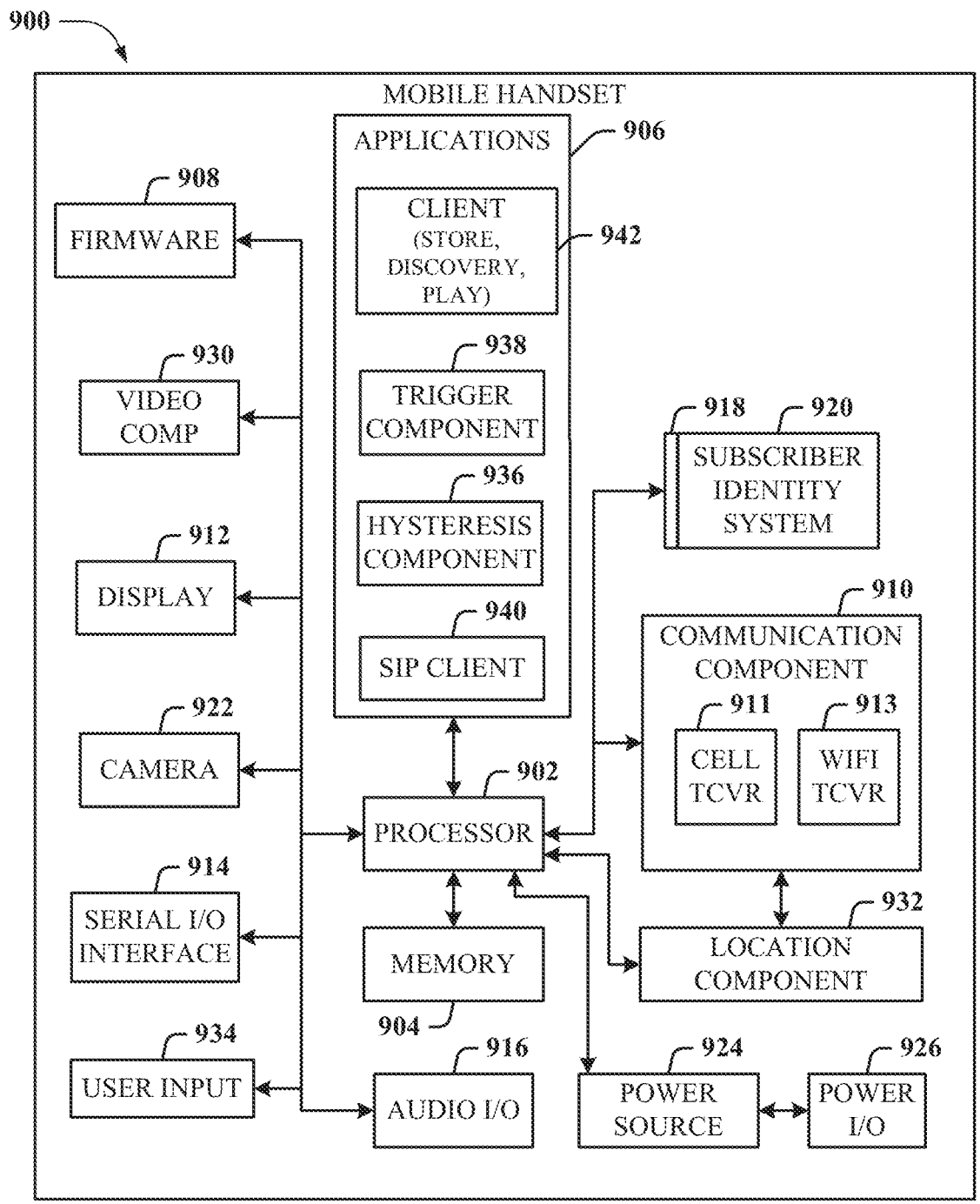
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 1010 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
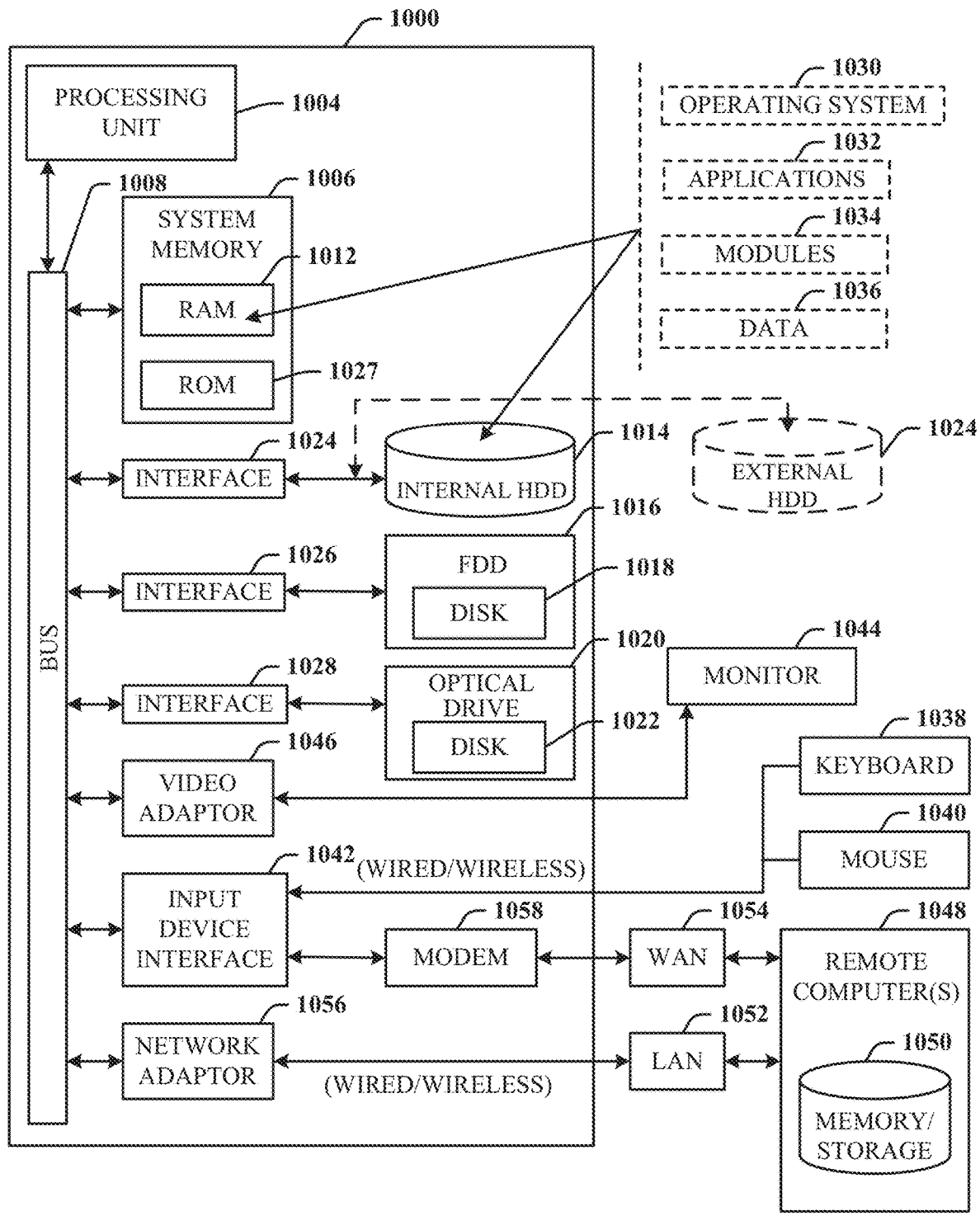
FIG. 10 illustrates an example block diagram of an example computer operable to engage in a system architecture that facilitates wireless communications according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprisewide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device,"

"mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet. Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of $1/3$ with rate matching. This design does not taken into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a network device of a communications network and comprising a processor, a first resource configuration related to first measurement resources of a first radio link between a mobile device and a first distributed unit of distributed units of the communications network;
   determining, by the network device, a second resource configuration related to a second measurement resource of a second radio link between the mobile device and a second distributed unit of the distributed units;

communicating, by the network device, the first resource configuration to the second distributed unit and the second resource configuration to the first distributed unit;

assigning, by the network device, a first timer and a first counter for a first detection of a first radio link interruption and a second timer and a second counter for a second detection of a second radio link interruption; and facilitating, by the network device, a reception of a report that comprises measurements of the first resource configuration and the second resource configuration, wherein the report is received from the mobile device in response to a detection of a blockage-based beam failure event of a millimeter wave; and implementing an inter-distributed unit switch procedure between the first distributed unit and the second distributed unit in response to the detection of the blockage-based beam failure event of the millimeter wave.

2. The method of claim 1, further comprising:
prior to the communicating the first resource configuration and the second resource configuration, coordinating, by the network device, the first resource configuration and the second resource configuration among the first distributed unit and the second distributed unit.

3. The method of claim 1, wherein the communicating is facilitated by a central unit communicatively coupled to the first distributed unit and the second distributed unit.

4. The method of claim 1, further comprising:
wherein the first radio link interruption is between the mobile device and the first distributed unit and the second radio link interruption is between the mobile device and the second distributed unit, and wherein an expiration of the first timer or the second timer results in a determination that the radio link interruption has occurred.

5. The method of claim 1, wherein the determining the first resource configuration and the determining the second resource configuration comprise determining respective transmission/reception nodes controlled by the first distributed unit and the second distributed unit.

6. The method of claim 1, wherein the determining the first resource configuration and the second resource configuration comprise determining a beam forming capability of the mobile device, the first distributed unit, and the second distributed unit.

7. The method of claim 1, wherein the determining the first resource configuration and the second resource configuration comprise determining a first network traffic load of the first distributed unit and a second network traffic load of the second distributed unit.

8. The method of claim 1, wherein the determining the first resource configuration and the second resource configuration comprise determining a multi-connectivity configuration of the first distributed unit and the second distributed unit.

9. The method of claim 1, wherein the determining the first resource configuration and the second resource configuration comprise evaluating a received radio link interruption report or a beam measurement report from the mobile device.

10. The method of claim 1, wherein the first distributed unit is a cell device servicing the mobile device and the second distributed unit is a neighboring cell device.

11. The method of claim 1, wherein the first distributed unit is associated with a first transmission/reception node servicing the mobile device and the second distributed unit is associated with a second transmission/reception node.

12. The method of claim 1, wherein the first distributed unit and the second distributed unit represent a function protocol split across a first transmission/reception node and a second transmission/reception node, and wherein the first distributed unit controls the first transmission/reception node and the second distributed unit controls the second transmission/reception node.

13. The method of claim 1, wherein the facilitating the reception of the report comprises facilitating beam switch procedures for the mobile device, wherein the beam switch procedures enable the mobile device to operate according to a fifth generation wireless communication network protocol.

14. A system, comprising:
a processor; and
a memory that stores executable instructions that, when executed by the processor, facilitate performance of operations, comprising:
generating a first report that comprises a first resource configuration related to first measurement resources of a first radio link between a mobile device and a first distributed unit of distributed units of a communications network;
generating a second report that comprises a second resource configuration related to a second measurement of a second radio link between the mobile device and a second distributed unit of the distributed units;
communicating the first resource configuration to the second distributed unit and the second resource configuration to the first distributed unit;
configuring a first timer and counter combination for a first detection of a first radio link interruption between the mobile device and the first distributed unit; and
in response to a detection of a blockage of a millimeter wave associated with a communication of data flow packets between the mobile device and the first distributed unit,
facilitating a reception of a combined report from the mobile device that comprises measurements of the first resource configuration and the second resource configuration; and
switching the communication of data flow packets from the first radio link between the mobile device and the first distributed unit to the second radio link between the mobile device and the second distributed unit.

15. The system of claim 14, wherein the operations further comprise:
determining a combined configuration based on a coordination of the first resource configuration and the second resource configuration among the first distributed unit and the second distributed unit.

16. The system of claim 14, wherein the operations further comprise:
configuring a second timer and a second counter for a second detection of a second radio link interruption between the mobile device and the second distributed unit.

17. The system of claim 14, wherein the facilitating the reception of the combined report comprises generating the combined report that is specific to the mobile device.

18. A non-transitory machine-readable storage medium, comprising executable instructions that, when executed by a processor, facilitate performance of operations, comprising:

determining respective resource configurations for distributed units in a communications network;

sending respective indications of the respective resource configurations to the distributed units;

establishing a timer and counter pair for detection of a radio link interruption of a communication transmitted via a first millimeter wave;

in response to an indication from a mobile device that the radio link interruption of the communication transmitted via the first millimeter wave has occurred based on an expiration of the timer due to a blockage of the first millimeter wave between the mobile device and a first distributed unit of the distributed units:

facilitating sending a coordinated report to the mobile device, wherein the coordinated report comprises the respective resource configurations and is customized to the mobile device; and performing a beam switch procedure that moves the communication to a second millimeter wave transmitted between the mobile device and a second distributed unit of the distributed units.

19. The non-transitory machine-readable storage medium of claim 18, wherein the respective resource configurations comprise a first resource configuration of the first distributed unit and a second resource configuration of the second distributed unit, wherein the operations further comprise communicating the first resource configuration to the second distributed unit and the second resource configuration to the first distributed unit, and wherein the communicating is facilitated by a central unit communicatively coupled to the first distributed unit and the second distributed unit.

20. The non-transitory machine-readable storage medium of claim 18, wherein the operations further comprise assigning a first timer and a first counter for a first detection of a first radio link interruption between the mobile device and a first distributed unit of the distributed units and a second timer and a second counter for a second detection of a second radio link interruption between the mobile device and the second distributed unit of the distributed units, and wherein the expiration of the first timer or the second timer results in a determination that the radio link interruption has occurred.

\* \* \* \* \*